(12) United States Patent
Bellstedt et al.

(10) Patent No.: US 8,971,509 B2
(45) Date of Patent: Mar. 3, 2015

(54) FEATURE-BASED SOFTWARE SYSTEM FOR PROGRAMMING OF A BUSINESS PBX

(71) Applicant: Fractel, LLC, Indialantic, FL (US)

(72) Inventors: Olaf Bellstedt, Malabar, FL (US); Michael A. Crown, Indialantic, FL (US)

(73) Assignee: Fractel, LLC, Indialantic, FL (US)

( * ) Notice: Subject to any disclaimer, the term of this patent is extended or adjusted under 35 U.S.C. 154(b) by 0 days.

(21) Appl. No.: 14/329,530

(22) Filed: Jul. 11, 2014

(65) Prior Publication Data

US 2015/0016596 A1    Jan. 15, 2015

Related U.S. Application Data

(60) Provisional application No. 61/845,111, filed on Jul. 11, 2013.

(51) Int. Cl.
*H04M 3/42*        (2006.01)
*H04M 7/00*        (2006.01)

(52) U.S. Cl.
CPC .......... *H04M 3/42314* (2013.01); *H04M 7/009* (2013.01)
USPC .................. 379/201.03; 379/201.02; 379/225

(58) Field of Classification Search
USPC ........... 379/201.03, 201.01, 201.02, 225, 219
See application file for complete search history.

(56) References Cited

U.S. PATENT DOCUMENTS 8,195,163 B2 *   6/2012   Gisby et al. ................ 455/435.1
8,862,180 B2 *  10/2014   Vendrow et al. ........... 455/554.1

* cited by examiner

*Primary Examiner* — Thjuan K Addy
(74) *Attorney, Agent, or Firm* — Daniel C. Pierron; Mark R. Malek; Widerman Malek, PL

(57) ABSTRACT

A system for processing phone calls comprising a network of servers in communication with telephonic communication devices, and software stored on and executable by the servers, the software being configured to receive inputs from a user, generate an ordered set of PBX Feature definitions executable by the server network in a distributed fashion to perform respective PBX Feature tasks related to telephone calls, and write the PBX Feature definitions to a distributed database system that is accessible by the servers. The ordered set may evaluate the current state of a phone call, and each PBX feature definition may perform a respective task responsive to the evaluated state. Each PBX Feature definition is executable to define and store a new state of the phone call. Each PBX Feature definition generated by the software is configured to be combined with any other PBX Feature definition generable by the software.

20 Claims, 7 Drawing Sheets

100

Manage Devices

| Value | Field |
|---|---|
| Polycom IP650 | Device Type — 110 |
| Line 1 | Line Number — 130 |
| 111b82469c53 | Device MAC |
| Reception | Device Label — 140 |
|  | Directory First Name |
|  | Directory Last Name |
| 100 | Speed Dial |
| 210 | Local Area Code (3 digits only) — 150 |
| None | Access Control |
| 3108930702 | Caller ID |
| ACME HQ | E911 Location |
| Voice2Email | Timeout Service |
| vmail@acmewidgets.com | Voicemail Email |
| Default | Voicemail Greeting |
| 30 | Timeout (Seconds) |
| yes | Device Active |
| GMT-05:00 : EST5EDT | Time Zone |
| None | Encryption |

Callouts: 120, 160, 170, 190, 180

Manage Ring Groups

| Sales | Ring Group Name — 210 |
| 60 | Ring Timeout (Seconds) |
| simultaneous | Ring Group Strategy — 220 |
| Device | Timeout Service |
| Reception | Device — 230 |
| yes | RingGroup Active  232 |

Devices:
- Sales 1
- Sales 2
- Sales 3
- Billing 1
- Billing 2
- Reception
- Support 1

240

[ Move Device Up ]  [ Move Device Down ]

Manage Scheduler

| | |
|---|---|
| HQ Hours | Route Name — 410 420 |
| GMT-04:00 : EST5EDT | Time Zone |
| IVRMenu | Business Hours Service |
| HQ Attendant | Business Hours IVR Menu — 430 |
| Voice2Email | After Hours Service |
| vmail@acmewidgets.com | After Hours Voicemail Email |
| Default | After Hours Voicemail Greeting |
| Forward | Holiday Hours Service |
| 8005551212 | Holiday Hours Dial Number |
| yes | Route Active — 440 |
| Scheduler | Override Mode |
| | Override Extension — 450 |

460 →

| Week Day | Business Open | Business Close | Lunch Close (Optional) | Lunch Open (Optional) |
|---|---|---|---|---|
| Monday | 09:00 | 17:00 | 00:00 | 00:00 |
| Tuesday | 09:00 | 17:00 | 00:00 | 00:00 |
| Wednesday | 09:00 | 17:00 | 00:00 | 00:00 |
| Thursday | 09:00 | 17:00 | 00:00 | 00:00 |
| Friday | 09:00 | 17:00 | 00:00 | 00:00 |
| Saturday | 00:00 | 00:00 | 00:00 | 00:00 |
| Sunday | 00:00 | 00:00 | 00:00 | 00:00 |

470 →

| Holiday Name | Holiday Start | Holiday End |
|---|---|---|
| Independence Day | 07-04 00:00 [reset] | 07-05 00:00 [reset] |
| Thanksgiving | 11-21 00:00 [reset] | 11-25 00:00 [reset] |
| Holiday3 | 00-00 00:00 [reset] | 00-00 00:00 [reset] |

FEATURE-BASED SOFTWARE SYSTEM FOR PROGRAMMING OF A BUSINESS PBX

RELATED APPLICATIONS

This application claims the benefit under 35 U.S.C. §119 (e) of U.S. Provisional Patent Application Ser. No. 61/845,111 titled Feature-Based Software System for Programming of a Business PBX filed Jul. 11, 2013, the content of which is incorporated by reference herein in its entirety, except to the extent disclosure therein is inconsistent with disclosure herein.

FIELD OF THE INVENTION

The present invention is in the technical field of software. More particularly, the present invention is in the technical field of business private branch exchange (PBX) software.

BACKGROUND OF THE INVENTION

Previous Business PBX Programming systems can be separated into two categories: those that use menus and forms to modify a pre-defined set of standard configurations or programming templates, and those that use a complex scripting or "dial plan" coding language. The former category is what could be described as "easy to use", but is limited with regard to flexibility. The latter category offers much more flexibility, but requires extensive training and experience to use effectively.

Additionally, previous PBX programming systems have required one-to-one association between a given PBX system and a server associated with and dedicated to that system. Accordingly, as the computational demands of a PBX system change, the server must be replaced, particularly in the instance of increasing the processing capability of the server, in order to accommodate the increased demands of the system. Such replacement is costly and requires a certain amount of down time during replacement, which is disadvantageous for operating businesses. Accordingly, there is a need in the art for a telephonic processing system, such as a PBX system, that can dynamically increase the processing resources available to a given PBX system while avoiding any outage of service.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

The present invention is a software system that provides an easy to use and intuitive framework for creating, visualizing, verifying, and monitoring the configuration of business PBX functionality. An analogy to the invention can be found in Computer Aided Design (CAD) software. In much the same way that modern Feature-Based 3D CAD software abstracts basic "Geometry" (planes, cylinders, etc.) into "Features" (slots, holes, etc.), the invention abstracts complex PBX phone call handling instructions into logical building blocks ("PBX Features"), and transparently provides the underlying logic required to combine PBX Features ad hoc to control the processing of phone calls. The invention also provides a familiar graphical user interface of menus and forms for defining and visualizing the desired set of PBX Features and the rules to control routing of calls from one PBX Feature to another.

The invention resolves the previously existing dichotomy of flexibility versus ease of use, enabling a self-service user model without placing any unnecessary restrictions on the ultimate complexity of the PBX deployment. The object-oriented design and implementation of the system not only offers ease of use, but also allows the system to leverage a cloud-based deployment architecture to support an effectively unlimited number of PBX instances on a single system. Additionally, it facilitates a unique Software as a Service (SaaS) business model by providing a framework for "a la carte" sale of PBX features. This model allows customers to easily and immediately add new functionality as needed, and to only pay for the functionality that they actually use.

With the above in mind, embodiments of the present invention are related to a system for processing phone calls comprising a network of servers positionable in communication with telephonic communication devices and each comprising a memory and a processor, and software stored on the memory of the servers and configured to be executed by the processors. The software may be configured to receive a series of inputs from a user, generate an ordered set of PBX Feature definitions executable by the network of serves in a distributed fashion to perform respective PBX Feature tasks related to telephone calls responsive to the series of inputs, and write the ordered set of PBX Feature definitions to a distributed database system that is accessible by the servers so as to be executable by the servers.

The ordered set of PBX Feature definitions may be executable to evaluate the current state of a phone call. Upon completion of the analysis, the ordered set of PBX Feature definitions may generate an evaluated state of the phone call. Furthermore, a PBX Feature definition of the ordered set of PBX Feature definitions may be executable to perform a respective PBX Feature task responsive to the evaluated state of the phone call. Additionally, each PBX Feature definition of the ordered set of PBX Feature definitions may be executable to define and store a new state of the phone call upon completion of performance of the PBX Feature task. Each PBX Feature definition of the ordered set of PBX Feature definitions generated by the software may be configured to be combined with any other PBX Feature definition generable by the software.

In some embodiments, the distributed database system may be stored on the memory of each server. Furthermore, the system may be configured to modify the distributed database system stored on the memory of every server of the plurality of servers responsive to the modification of the distributed database system on one server of the plurality of servers. Additionally, the PBX Features of the ordered set of PBX Feature definitions may be selected from the group consisting of telephonic device features, ring group features, interactive voice response features, schedule features, and direct inward dial features.

In some embodiments, the distributed database system may comprise a plurality of ordered sets of PBX Feature definitions. Additionally, the distributed database system may further comprise a first ordered set of PBX Feature definitions and a second ordered set of PBX Feature definitions. Each of the first and second ordered sets of PBX Feature definitions may be executable on a single server of the network of servers. Furthermore, the first ordered set of PBX Feature definitions may be associated with a first PBX system, and the second ordered set of PBX Feature definitions may be associated with a second PBX system. A plurality of servers of the network of servers may be configured to execute an ordered set of PBX Feature definitions of the distributed database system.

In some embodiments, the ordered set of PBX Feature definitions may be executable by a plurality of servers of the network of servers on an instant phone call. Furthermore, an ordered set of PBX Feature definitions may comprise a first Feature definition and a second Feature definition. The first Feature definition may be executable on at least one server of the network of servers, and the second Feature definition may be optionally executable on a server of the network of servers other than the server that executed the first Feature definition.

In some embodiments, a PBX Feature definition of an ordered set of PBX Feature definitions may be at least one of modifiable and deletable responsive to an input from a user.

Additionally, embodiments of the present invention are related to a system for processing phone calls comprising a server positionable in communication with a telephonic communication device and comprising a memory and a processor and software stored on the memory of the server and configured to be executed by the processor. The software may be configured to receive a series of inputs from a user, generate an ordered set of PBX Feature definitions executable by the server to perform respective PBX Feature tasks related to a telephone call responsive to the series of inputs, and write the PBX Feature definitions to a feature database that is accessible by the server so as to be executable by the server.

The ordered set of PBX Feature definitions may be executable to evaluate the current state of a phone call, defining an evaluated state of the phone call. Furthermore, a PBX Feature definition of the ordered set of PBX Feature definitions may be executable to perform a respective PBX Feature task responsive to the evaluated state of the phone call. Additionally, each PBX Feature definition of the ordered set of PBX Feature definitions may be executable to define and store a new state of the phone call upon completion of performance of the PBX Feature task. Each PBX Feature definition generated by the software may be configured to be combined with any other PBX Feature definition generable by the software.

BRIEF DESCRIPTION OF THE DRAWINGS

FIG. 1 depicts a form for defining the configuration of a "Device" according to an embodiment of the invention.

FIG. 2 depicts a form for defining the configuration of a "Ring Group" PBX Feature according to an embodiment of the invention.

FIG. 3 depicts a form for defining the configuration of an "IVR Menu" PBX according to an embodiment of the invention.

FIG. 4 depicts a form for defining the configuration of a "Scheduler" PBX Feature according to an embodiment of the invention.

FIG. 6 depicts a "Feature Tree" diagram, displaying defined PBX Features and phone call routing according to an embodiment of the invention.

DETAILED DESCRIPTION OF THE INVENTION

Figure 5:
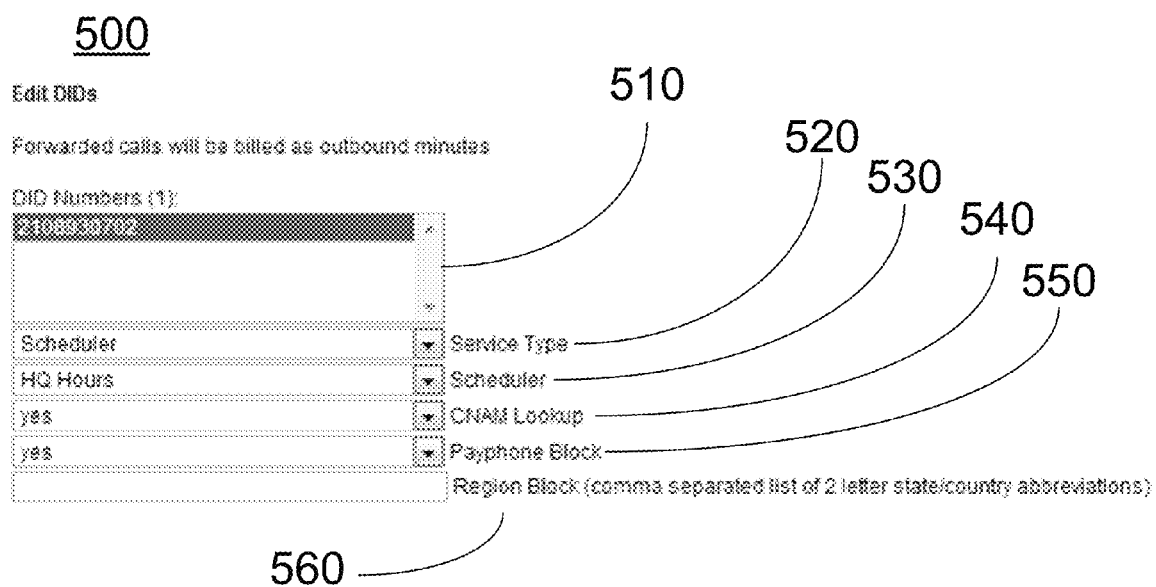
FIG. 5 depicts a form for defining the routing of a "DID" (Direct Inward Dial) telephone number according to an embodiment of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure.

In broad embodiment, the present invention is a framework and implementation of said framework on a PBX system for abstraction of business PBX programming instructions into logical functional objects ("PBX Features") and for combining said PBX Features together ad hoc to create a functional PBX for routing of telephone calls. The framework may be implementable by any method as is known in the art. In the present embodiment, the framework may be implementable and accessible by a user utilizing a graphical user interface (GUI). It is contemplated and included within the scope of the invention that the user may utilize other methods for implementing the framework, including, but not limited to, use of an application programming interface (API). In such embodiments, an input received from a user may comprise an API instruction. Such an API instruction may cause the generation of a PBX Feature and implementation of the Feature into the PBX system.

Furthermore, the user may provide input to the PBX system through operation of a computerized device. The computerized device may be positioned in communication with the PBX system so as to provide input thereto that may result in the generation of the PBX features in the PBX system. Types of computerized devices may include personal computers, such as desktop computers and notebook computers, tablet/slate computers, smartphones, or any other computerized device that may provide an input to the PBX system. The computerized device may be configured to provide information to the user related to the implementation of the PBX system, including the presentation of a form or menu, as will be discussed in greater detail hereinbelow. The computerized device may be positioned in communication with the PBX system by any method known in the art, including direct connection and connection across a network, such as a personal area network, a local area network, a wide area network, such as the network, and any other type of network as is known in the art.

While the system described herein is referred to as a PBX software system, it is contemplated and included within the scope of the invention that the software is implementable on various other telephone exchanges, including, but not limited to, private automatic branch exchanges (PABX) and electronic private automatic branch exchanges (EPABX), as well as any other telephone exchange that is known in the art.

Figure 3:
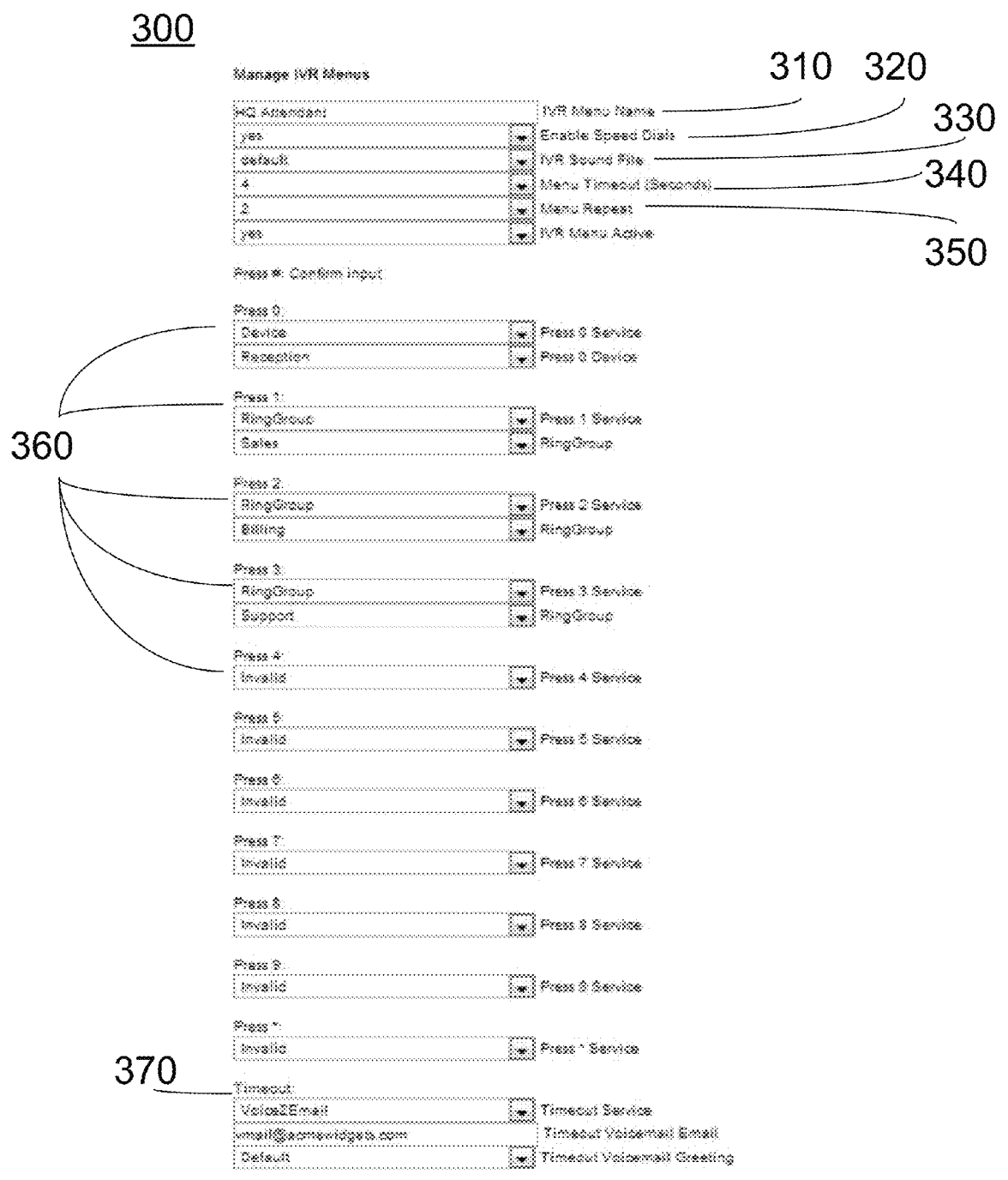

Referring now to FIGS. 1-6, an embodiment of a PBX software system, as stored on a computer readable medium and implementable on necessary attending PBX hardware, is depicted. It is known in the art that a PBX system may include a PBX server and one or more telephonic devices, such as a handset phone device. Such a device may have associated with it a processor, a visual display, a user input device such as an array of buttons or a touchpad, circuitry necessary for communicating with the PBX server, and a communication device capable of transmitting and receiving electronic signals to and from the PBX server. It is contemplated by the invention that the software described herein may be implemented on a PBX server so as to control the function of the PBX system. More specifically, the PBX software may be stored on a memory associated with or comprised by the PBX server and may be executable by a processor comprised by the PBX server.

As will now be shown in FIGS. 1-5, and described in the attending description, a variety of PBX Features will now be discussed. Each PBX Feature may be defined by a definition to perform a PBX Feature task related to telephone calls, including the routing of telephone calls within a PBX system. The nature of the task performed by each PBX Feature will depend on the type of input received from a user. Moreover, each PBX Feature definition may be executable by a PBX server or network of servers. Additionally, the PBX Feature definitions may be combinable so as to define an ordered set of PBX Feature definitions. In that way, the routing of any telephone calls to a given PBX system may be controlled by the ordered set of PBX Feature definitions.

When a telephone call is received by a PBX system according to embodiments of the invention, the PBX system may create a state associated with the call. The state may be an indication of the status of the call. An initial status may be assigned to the state of the machine indicating that the phone is to be routed according to an ordered set of PBX Feature definitions associated with the PBX system. Additionally, each PBX Feature may be configured to evaluate the state of an incoming phone call. Responsive to the evaluated state, the ordered set of PBX Feature definitions may execute one PBX Feature of the ordered set. Furthermore, once performance of the PBX Feature is complete, the state of the telephone call may be updated to reflect the performance of the PBX Feature. This process of evaluating the state of the call, executing a PBX Feature responsive to the evaluated state, and updating the state of the call may be repeated until the routing of the call is complete, which may be defined as at least one of a telephonic communication device associated with the PBX system answering the call, the caller associated with the call terminating the call, or directing the call to a voice message system.

Furthermore, each of the PBX Feature definitions described hereinbelow may be modifiable at a later date by the software used to generate each PBX Feature definition, either automatically or responsive to an input from a user, by a user directly modifying the definition. Modification may include altering the definition to change the task performed by the PBX Feature, and may also include the deletion of the PBX Feature. Accordingly, a PBX Feature definition of an ordered set of PBX Feature definitions is at least one of modifiable and deletable responsive to an input from a user. Additionally, any modification that may be made to a PBX Feature definition may be promulgated throughout the ordered set of PBX Feature definitions associated with the modified PBX Feature definition to reflect and adapt to the modification.

Referring now to FIG. 1, a first aspect of the inventive PBX system is now presented. More specifically, FIG. 1 depicts an embodiment of a PBX Feature definition form 100 for a telephonic device according to an embodiment of the invention. This form 100 is used to describe and configure an instance of a physical handset phone device that may be used by a user of the PBX system. Information that may be inputted by a user on the definition form 100 may include information related to the physical device 110, such as, for example, manufacturer and model, network media access control (MAC) address 120, and similar information as well as an indication as to who uses the device, including, for example, a Device Label 130 and/or a Directory Name 140, an indication as to the location of the device, such as Caller ID 160, an E911 location 170, and a Time Zone indication 180 and other user options, including, but not limited to, an action to be performed if the device is called and not answered, referred to as a Timeout Service 190. After definition, other PBX Feature instances can direct phone calls to this Device instance simply by referencing the Device Label (i.e. "Reception"). No additional programming is required to define and facilitate such routing and it is maintained even if the physical hardware or definition of the Device instance changes.

Referring now to FIG. 2, another aspect of the inventive PBX system is depicted. More specifically, FIG. 2 depicts another embodiment of a PBX Feature definition form 200 of the present invention. In the present embodiment, the PBX Feature instance being defined is a "Ring Group". The PBX Feature definition form 200 may permit a user to provide an input assigning a Name 210 to a Ring Group instance. In the present depiction, the Ring Group instance is assigned the name "Sales." The PBX Feature definition form 200 may permit the user to provide an input assigning any name to a Ring Group instance. The PBX Feature definition form 200 may further include additional parameters including, as an example, a Ring Group Strategy 220. The Ring Group Strategy 220 may present the user with a list of options for selection by the user for the order in which the Devices associated with the Ring Group instance have a given phone call routed to them. Two examples are, first, "Sequential", where a first Device has the phone call routes thereto, and then, after a period of time, the next Device in the Ring Group instance has the call routed thereto. This pattern is repeated either until all the Devices in the Ring Group instance have the call routed to them one or more times, the number of times being definable by the user, or after a period of time has elapsed, in both cases the Device that currently has the phone call routed to it never being answered by a user of the Device. A second example is "Simultaneous", where all the Devices associated with the Ring Group instance have the phone call routed thereto concurrently, and where the first user of any of the Devices associated with the Ring Group instance to answer the phone call receives the phone call. These examples of Ring Group Strategy are exemplary only, and any other type of strategy, including combinations of the strategies presented hereinabove, are contemplated and included within the scope of the invention.

The PBX Feature definition form 200 may further include an option defining the action to be performed if a call is not answered to be inputted by the user, referred to as a Timeout Service 230. In some embodiments, the Timeout Service 230 may be to route the phone call to a Device 232. In the present example, the Timeout Service 230 is set to route the phone call to the Device instance defined in FIG. 1 ("Reception"). Other operations may be performed and included within Timeout Service 230 options, including routing the phone call to a voice mail service. Additionally, where a telephone call is routed pursuant to the Timeout Service 230 instruction the Ring Group Feature may update the state of the telephone call to reflect being so routed.

The PBX Feature definition form 200 may further include a list of Device instances 240. The list of Device instances 240 may include all or a subset of Devices defined by a used using PBX Feature definition form 100 as described hereinabove. The PBX Feature definition form 200 may be adapted to permit a user to provide an input selecting one or more Device instances from the list of Device instances 240. Each Device instance selected from the list of Device instances 240 may be included in the present Ring Group instance currently being defined by the user. After definition, other PBX Features can direct phone calls to this Ring Group instance simply by referencing the Name (i.e. "Sales"). No additional programming is required to define and facilitate such routing and it is maintained even if the definition of the Ring Group instance changes.

Where a telephone call state is directed to a Ring Group Feature, the Ring Group Feature may route the call to the telephonic communication devices associated with the Ring Group Feature instance. Furthermore, the Ring Group Feature may update the state of call to indicate that the call has been routed to the telephonic communication devices associated with the Ring Group Feature instance.

Referring now to FIG. 3, there is shown another embodiment of a PBX Feature definition form 300. In this case, the PBX Feature instance being defined is an Interactive Voice Response Menu 310 or "IVR Menu". We see that this IVR Menu instance 310 has been named "HQ Attendant". We also see option parameters that control the IVR Menu, including the option to dial user extensions directly while in the IVR Menu 320, the voice prompt to be played 330, and the menu timeout 340 and play repeat count 350. Below this we see, for each possible digit entry option (0 through 9), the type of service routing and the names of the specific PBX Feature instances selected to provide the respective services 360. Finally, we see the type of service routing and the name of the specific PBX Feature instance to be performed in the event of a "timeout" or no digit entry from the caller 370. Note that the service routing selected for "Press 0" is a "Device" and the Device instance selected is the example shown in FIG. 1 ("Reception"). Also, note that the service routing selected for "Press 1" is a Ring Group, and that the Ring Group instance selected is the example shown in FIG. 2 ("Sales"). Other options route to similar Ring Group instances ("Billing", "Support", etc.). No additional programming is required to define and facilitate these routings.

Where a telephone call state is directed to an IVR Menu Feature, the IVR Menu Feature may route the call responsive to a digit entry from the caller. Furthermore, the IVR Menu Feature may update the state of call to indicate that the call has been routed responsive to the digit input of the caller. In some instances, the IVR Menu Feature may route the call to a Ring Group Feature. In such instances, the IVR Menu Feature may update the state of the call to reflect being routed to a Ring Group Feature. In other instances, the IVR Menu Feature may route a call directly to a Telephonic Device Feature. In such instances, the IVR Menu Feature may update the state of the call to reflect being routed to the Telephonic Device Feature.

Referring now to FIG. 4, another embodiment of a form defining a PBX Feature instance 400 is presented. This form 400 defines an office hours routing "Scheduler". In this form 400 of the present embodiment, the Scheduler instance has been given the name "HQ Hours" 410. It is appreciated and included within the scope of the invention that any given Scheduler instance may be given any name by a user. Furthermore, the form 400 may include a field for a user to designate a time zone 420 associated with the instance. Additionally, the form 400 may further be adapted to permit the user to select a type of service routing for the three states of the Scheduler. The three states illustrated in form 400 are open, closed, and holiday. It is contemplated and included within the scope of the invention that any number and type of states may be added to the form 400 to permit the user greater flexibility in the Scheduler operation. Furthermore, the form 400 is configured to present names of specific PBX Feature instances and to allow a user to select one or more of the PBX Feature instances to provide the respective service 430. The form 400 may further include an option on the form to override the state of the scheduler 440, as well as a digit string 450 which can be dialed to override the state of the scheduler. Each of the Override Mode 440 and the Override Extension 450 may be selected and defined, respectively, by the user. The form 400 may further include conditions that determine the state of the scheduler. Types of conditions included in the form 400 may include, but are not limited to, Business Open, Business Close, and Lunch Schedule for each day of the week 460, and the office Holidays 470. It is important to note that the service routing selected for the "Open" state is IVR Menu, and that the IVR Menu instance selected is the one defined in FIG. 3 ("HQ Attendant"). No additional programming is required to define and facilitate this routing. Additionally, the Scheduler Feature may update the state of a call to reflect being routed according the Scheduler Feature instance.

In FIGS. 1-4, the depiction of various PBX Feature instances being defined and used to control the processing of a phone call within and between respective instances were presented. Referring now to FIG. 5, a Menu 500 is presented. Menu 500 may be configured to facilitate a user in routing a Direct Inward Dial (DID) telephone number to a desired PBX Feature instance for processing. In the embodiment depicted in FIG. 5, there is a list of DIDs 510 that are accessible by a user. The list of DIDs may include some or all DID numbers associated with the PBX system. One or more DIDs of the DID list 510 may be selected by the user. In the present embodiment, the user has selected the only available DID selected DID (2108930702). Menu 500 may further include a Service Type field 520. The service type field 510 may be selectable by a user and may control various PBX Feature instances of the PBX system. In the present embodiment, the user has selected the Scheduler feature. Menu 500 may further include specific PBX Feature instance ("HQ Hours") 530 to be used for processing inbound calls made to this DID. Along with the specification of target PBX Feature, Menu 500 may further include various other options to control processing of the DID, including, for example, a display of caller ID 540 and call blocking from Payphones 550 or selected geographic regions 560. Again, once specified, no additional programming on the part of the user is required to define and facilitate this routing. Additionally, the Direct Inward Dial Feature may update the state of a call routed thereby to reflect the routing of the call.

Figure 6:
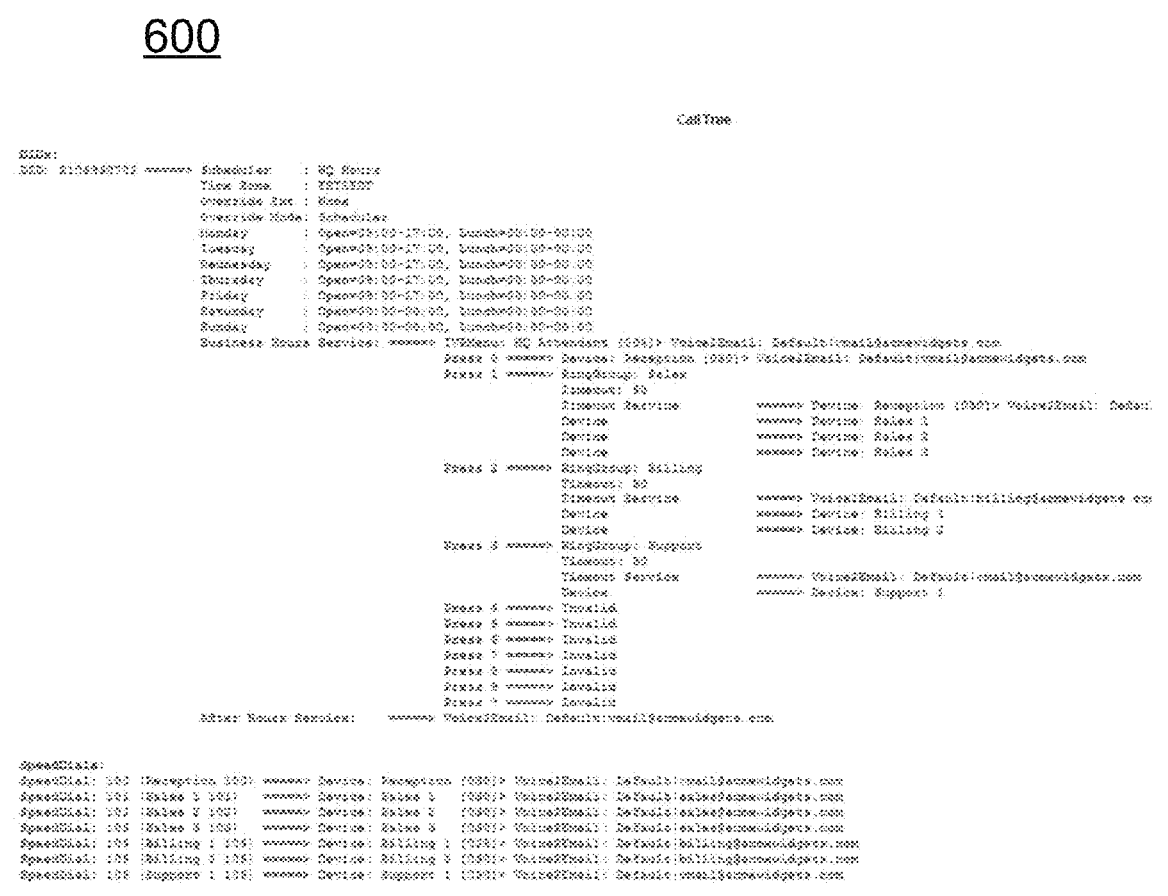

Referring now to FIG. 6, there is depicted the automatically generated "Call Tree" graph 600 that comprises an ordered set of PBX Feature definitions for a company associated with a user of the invention, illustrating the complete configuration as created by the actions shown in previous figures. Traversing from left to right, we can easily see all of the possible paths a call can potentially take through the PBX, and we can easily see the conditions which would cause a call to follow a respective path. More specifically, a call may be routed according to the various PBX Feature definitions comprised by the graph 600, and upon routing according to each PBX Feature, In the Call Tree graph, each PBX Feature instance name is a link to the menu used for definition of the respective instance, and the user can easily verify the details or edit a definition by clicking on the instance name.

In the instant graph 600, a first PBC Feature of the ordered set may be a Direct Inward Dial Feature 602. The ordered set is configured to evaluate the state of the call to determine the telephone number 604 to which the call is directed, in this instance 2108930702. Once the telephone number 604 has been determined, the ordered set may determine if the ordered set comprises a Direct Inward Dial Feature associated with the telephone number 604, the ordered set may execute the Direct Inward Dial Feature 602 associated with the telephone number 604. In this instance, the Direct Inward Dial Feature 602 is configured to hand off the call to a Schedule Feature 606. In handing off the call, the Direct Inward Dial Feature 602 may update the state of the call to reflect being handed off to the Schedule Feature 606.

Once the call has been received by the Schedule Feature 606, the Schedule Feature 606 may determine how to route the call according to the definition of the Schedule Feature 606, e.g. determine the present day of the week and time of day, if an override extension exists, and if so, what the override mode is, and route the call accordingly. In the event that the call occurs outside of Business Hours 608, as defined in the Schedule Feature 606, the Schedule Feature 606 may be defined to route the call to a voice mail system. Furthermore, the Schedule Feature may update the state of the call to reflect being so routed. If the occurs within Business Hours 608, the Schedule Feature 606 may hand off the call to an Interactive Voice Response (IVR) Feature 610, and update the state of the call to reflect being so routed.

The IVR Feature 610 may be configured to provide prompts to the caller associated with the telephone call, and to route the call responsive to a digit input from the caller, or a lack of such an input. In some instances, the IVR Feature 610 is configured to route the call to a Telephonic Device Feature 612. Where so routed, the IVR Feature 610 may update the state of the call to reflect being routed to a telephonic device. In some instances, the IVR Feature 610 may be configured to route the call to a Ring Group Feature 614, and may further be configured to update the state of the call to reflect being routed to the Ring Group Feature. The Ring Group Feature 614 may be configured to route a call received thereby to one or more Telephonic Device Features 612 or to a voice message system, and to update the state of the call to reflect such routing.

Figure 7:
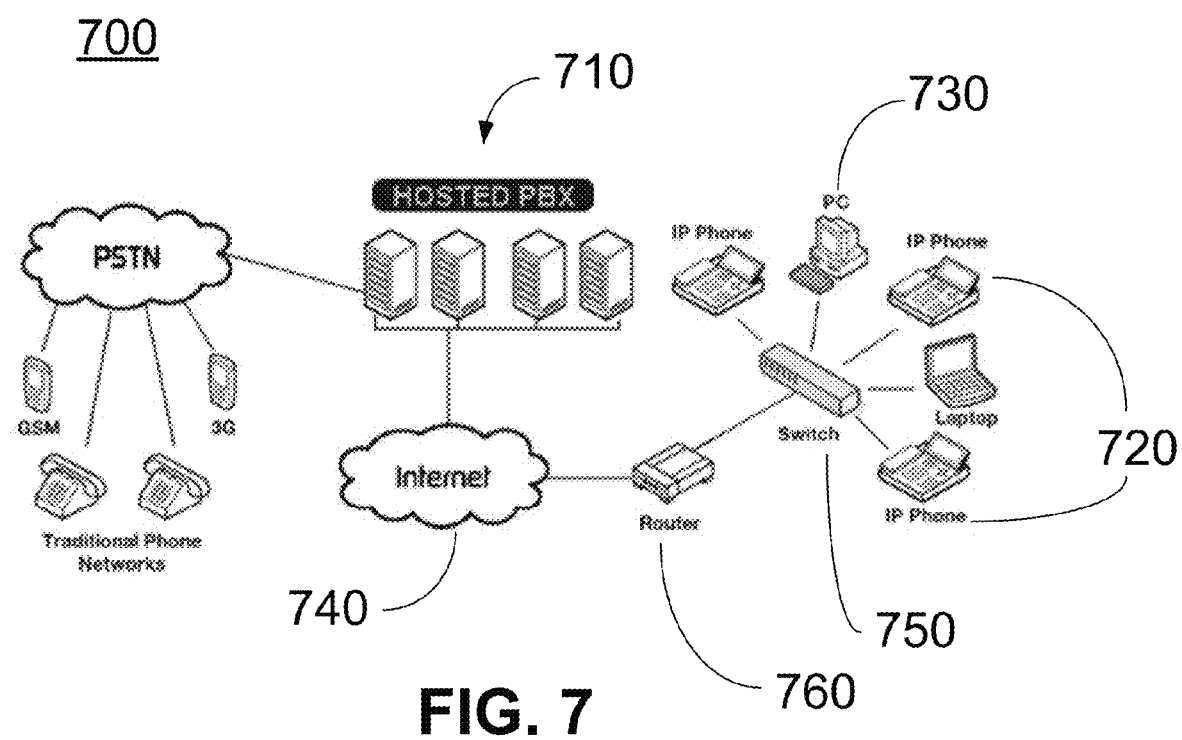
FIG. 7 depicts a Hosted PBX network upon which the PBX features and devices may be implemented.

FIG. 7 is offered to illustrate typical components of a "Hosted PBX" network 700 which would be one of many potential embodiment of the invention, with described software installed and executing on computer servers shown as "Hosted PBX" 710. In the example illustrated, internet protocol (IP) phones 720 and other voice-over-internet-protocol (VoIP) devices 730, including computerized devices such as desktop computers, laptop computers, tablets, and the like, are shown to connected to servers via a wide area network 740, such as, for example, the Internet, through a switch 750 and router 760. However, it will be understood by those skilled in the art that various methods and topologies of networking are applicable and contemplated by the invention, and that the present embodiment of invention is not restricted to the specifics illustrated. It is also understood to those skilled in the art that the number and type of devices might vary from those illustrated and that one function of invention is to program a specific PBX instance to operate correctly with any number of potential configurations.

The servers may be a network of servers configured to intercommunicate among one another. Moreover, each server of the network of servers may comprise a processor and a memory. On each server memory there may be stored thereon software as described hereinabove to facilitate the programming of a PBX system on the server. More specifically, each server may be configured to receive a series of inputs from a user, such as inputs on the forms illustrated in FIGS. 1-5, and execute the software using the processor associated with the server. Responsive to the user inputs, the software may be configured to generate an ordered set of PBX Feature definitions. An example of such definitions is illustrated in FIG. 6. The ordered set of PBX Feature definitions may include PBX Features, such as those Features described in FIGS. 1-5 and the attending description.

Additionally, in some embodiments, the system may comprise a distributed database system. The distributed database system may be comprised by each of the servers of the network of servers. The distributed database system may be a repository of a plurality of ordered sets of PBX Feature definitions. Each ordered set of PBX Feature definitions may be associated with a discrete PBX system, such as a PBX system associated with a particular business comprising a plurality of telephonic devices. Each ordered set of PBX Feature definitions comprised by the distributed database system may be accessible and executable by one or more servers of the network of servers. In some embodiments, each ordered set of PBX Feature definitions comprised by the distributed database system may be accessible and executable by each server of the network of servers. The PBX Feature definitions associated with a discrete PBX system may enable one or more servers of the network of servers to route a telephone call associated with the discrete PBX system according to the ordered set of PBX Feature definitions associated with the discrete PBX system.

Moreover, the ordered set of PBX Feature definitions associated with a discrete PBX system may initially be performed by a first server of the network of servers, and subsequently performed by a second server of the network of servers for an instant phone call. More specifically, an ordered set of PBX Feature definitions may comprise a first PBX Feature definition and a second PBX Feature definition. The first PBX Feature definition may be executable on at least one server of the network of servers, and the second PBX Feature definition may be optionally executable on a server of the network of servers other than the server that executed the first Feature definition. The network of servers may be configured to determine which server of the network of servers will execute a given ordered set of PBX Feature definitions, and which server will execute each PBX Feature definitions of an ordered set of PBX Feature definitions. Accordingly, the ordered set of PBX Feature definitions may be executable by a plurality of servers of the network of servers on an instant phone call. An ordered set comprising any number of PBX Feature definitions may be executed on any number of servers of the network of servers.

In this way, the network of servers may dynamically allocate processing resources thereof to the discrete PBX system on an as-needed basis. Furthermore, where additional processing resources become needed to process all the phone calls associated with the plurality of discrete PBX systems controlled by the plurality of ordered sets of PBX Feature definitions, additional servers may be added on the fly, thereby obviating the need for shutting down any of the discrete PBX systems, as would be needed to replace a dedicated server therefore.

Where the distributed database system comprises a plurality of ordered sets of PBX Feature definitions, it may comprise a first ordered set of PBX Feature definitions and a second ordered set of PBX Feature definitions. In some embodiments, each of the first and second ordered sets may be executable on a single server of the network of servers. In other embodiments, the first ordered set may be executed on a first server of the network of servers, and the second ordered set may be executed, either concurrent, precedent, or subsequent to the execution of the first ordered set, on a second server of the network of servers other than the first server.

Each server of the network of servers may have stored on memory associated therewith a copy of the distributed database system. In this way, each server of the network of servers may have the plurality of ordered sets of PBX Feature definitions accessible in a time range that meets the relatively low amount of time that is acceptable for the routing of phone calls. By storing the definitions locally, telephone calls may be routed expediently.

Additionally, where a modification is made to a PBX Feature definition of any of the ordered sets of PBX Feature definitions comprised by the distributed database system, the modification may be promulgated to the distributed database system maintained by each server of the network of servers. Accordingly, each instance of the ordered set of PBX Feature definitions associated with the modified PBX Feature definition comprised by the servers of the network of servers associated with the distributed database system may be updated to include the modification of the PBX Feature definition. Such modification may include the deletion of the PBX Feature definition.

In some embodiments, in place of the network of servers as described hereinabove, a single server positionable in communication with a telephonic communication device and comprising a memory and a processor may have stored thereon software to enable the programming of a PBX system as described hereinabove. In such embodiments, the ordered set of PBX Feature definitions generated by the software may be written to a Feature database associated with the server. In some embodiments, the Feature database may be stored on the memory associated with the server. The Feature database may comprise a plurality of ordered sets of PBX Feature definitions, such that a plurality of discrete PBX systems may have telephone calls processed by the server. In some embodiments, the Feature database may be comprised by a distributed database system as described hereinabove. In some such embodiments, a number of ordered sets of PBX Feature definitions may be assigned to the server, such that the server is the only server that processes phone calls for the PBX systems associated with those assigned ordered sets.

The advantages of the present invention include, without limitation, that it is easy to use, extremely flexible and scalable to support many individual PBX instances.

The underlying programming of each PBX Feature type is self-contained and maintains the logic instructions and data storage necessary to define an instance of the respective PBX Feature type as well as the logic instructions and data storage necessary to combine the instance with any other PBX Feature instance. This abstraction simplifies the PBX programming and maintenance task for the end user but does not restrict the complexity and scalability of a potential PBX configuration. In addition, training and re-programming required when options and functionality are added to a PBX Feature or when a new PBX Feature is introduced is minimal because the framework remains consistent and any changes to internal logic and storage are self-contained and bounded.

The Feature-Based framework not only offers benefits with regard to ease of deployment and maintenance for the end user, but also allows the system to fully leverage a cloud-based architecture to support an effectively unlimited number of customer PBX instances on a single system. As customer utilization grows, additional system nodes with software for executing PBX Feature logic can be deployed, adding capacity in a highly granular fashion. This also reaps benefits from a redundancy standpoint since resources are not dedicated to a particular customer or PBX instance, but to generic performance of PBX Feature logic. If a PBX Feature node is impaired, processing can be shifted to another node with no interruption of service.

Additionally, the invention facilitates a unique Software as a Service (SaaS) business model. Since each customer PBX instance is defined by a particular set and combination of PBX Feature instances, it is possible to for a customer to purchase "a la carte" only the PBX Features that they require at that time, and to purchase and immediately deploy on demand any new PBX Features that they may require in the future. This guarantees that the system is always the "right size" for the present, while allowing for growth or contraction in the future without economic or technical penalty.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended figures. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Many modifications and other embodiments of the invention will come to the mind of one skilled in the art having the benefit of the teachings presented in the foregoing descriptions and the associated drawings. The scope of the invention should be determined by the appended figures and their legal equivalents, and not by the examples given Therefore, it is understood that the invention is not to be limited to the specific embodiments disclosed.

What is claimed is:

1. A system for processing phone calls comprising:
a network of servers positionable in communication with telephonic communication devices and each comprising a memory and a processor; and
software stored on the memory of the servers and configured to be executed by the processors, the software being configured to:
receive a series of inputs from a user,
generate an ordered set of PBX Feature definitions executable by the network of servers in a distributed fashion to perform respective PBX Feature tasks related to telephone calls responsive to the series of inputs, and write the ordered set of PBX Feature definitions to a distributed database system that is accessible by the network of servers so as to be executable by at least one of server of the network of servers;

wherein the ordered set of PBX Feature definitions is executable to evaluate the current state of a phone call to generate an evaluated state of the phone call; and wherein a PBX Feature definition of the ordered set of PBX Feature definitions is executable to perform a respective PBX Feature task responsive to the evaluated state of the phone call;

wherein each PBX Feature definition of the ordered set of PBX Feature definitions is executable to define and store a new state of the phone call upon completion of performance of the PBX Feature task; and wherein each PBX Feature definition generated by the software is configured to be combined with any other PBX Feature definition generable by the software.

2. The system according to claim 1 wherein the distributed database system is stored on the memory of each server.

3. The system according to claim 2 wherein the system is configured to modify the distributed database system stored on the memory of every server of the plurality of servers responsive to the modification of the distributed database system on one server of the plurality of servers.

4. The system according to claim 1 wherein the PBX Features definitions of the ordered set of PBX Feature definitions are selected from the group consisting of telephonic device Features, ring group Features, interactive voice response Features, schedule Features, and direct inward dial Features.

5. The system according to claim 1 wherein the distributed database system comprises a plurality of ordered sets of PBX Feature definitions.

6. The system according to claim 5 wherein the distributed database system comprises a first ordered set of PBX Feature definitions and a second ordered set of PBX Feature definitions; and wherein each of the first and second ordered sets of PBX Feature definitions is executable on a single server of the network of servers.

7. The system according to claim 6 wherein the first ordered set of PBX Feature definitions is associated with a first PBX system; and wherein the second ordered set of PBX Feature definitions is associated with a second PBX system.

8. The system according to claim 5 wherein a plurality of servers of the network of servers are configured to execute an ordered set of PBX Feature definitions of the plurality of ordered sets of PBX Feature definitions of the distributed database system.

9. The system according to claim 1 wherein the ordered set of PBX Feature definitions are executable by a plurality of servers of the network of servers on an instant phone call.

10. The system according to claim 1 wherein an ordered set of PBX Feature definitions comprises a first Feature definition and a second Feature definition; wherein the first Feature definition is executable on at least one server of the network of servers; and wherein the second Feature definition is optionally executable on a server of the network of servers other than the server that executed the first Feature definition.

11. The system according to claim 1 wherein a PBX Feature definition of the ordered set of PBX Feature definitions is at least one of modifiable and deletable responsive to an input from a user.

12. A system for processing phone calls comprising:
a server positionable in communication with a telephonic communication device and comprising a memory and a processor; and
software stored on the memory of the server and configured to be executed by the processor, the software being configured to:
receive a series of inputs from a user,
generate an ordered set of PBX Feature definitions executable by the server to perform respective PBX Feature tasks related to a telephone call responsive to the series of inputs, and
write the ordered set of PBX Feature definitions to a Feature database that is accessible by the server so as to be executable by the server;
wherein the ordered set of PBX Feature definitions is executable to evaluate the current state of a phone call to generate an evaluated state of the phone call; and
wherein a PBX Feature definition of the ordered set of PBX Feature definitions is executable to perform a respective PBX Feature task responsive to the evaluated state of the phone call;
wherein each PBX Feature definition of the ordered set of PBX Feature definitions is executable to define and store a new state of the phone call upon completion of performance of the PBX Feature task; and
wherein each PBX Feature definition generated by the software is configured to be combined with any other PBX Feature definition generable by the software.

13. The system according to claim 12 wherein the feature database is stored on the memory of the server.

14. The system according to claim 12 wherein the PBX Feature definitions of the ordered set of PBX Feature definitions are selected from the group consisting of telephonic device features, ring group features, interactive voice response features, schedule features, and direct inward dial features.

15. The system according to claim 12 wherein the feature database is part of a distributed database system.

16. The system according to claim 12 wherein the feature database comprises a plurality of ordered sets of PBX Feature definitions; and wherein each ordered set of PBX Feature definitions is executable by the server.

17. The system according to claim 16 wherein the feature database comprises a first ordered set of PBX Feature definitions associated with a first PBX system and a second ordered set of PBX Feature definitions associated with a second PBX system.

18. The system according to claim 12 wherein a PBX Feature definition of the ordered set of PBX Feature definitions is at least one of modifiable and deletable responsive to an input from a user.

19. A system for processing phone calls comprising:
a network of servers positionable in communication with telephonic communication devices and each comprising a memory and a processor; and
software stored on the memory of the servers of the network of servers and configured to be executed by the processors, the software being configured to:
receive a series of inputs from a user,
generate an ordered set of PBX Feature definitions executable by the network of servers in a distributed fashion to perform respective PBX Feature tasks related to telephone calls responsive to the series of inputs, and write the PBX Feature definitions to a distributed database system that is accessible by the network of servers so as to be executable by at least one server of the network of servers;

wherein the ordered set of PBX Feature definitions is executable to evaluate the current state of a phone call to generate an evaluated state of the phone call;

wherein a PBX Feature definition of the ordered set of PBX Feature definitions is executable to perform a respective PBX Feature task responsive to the evaluated state of the phone call;

wherein each PBX Feature definition of the ordered set of PBX Feature definitions is executable to define and store a new state of the phone call upon completion of performance of the PBX Feature task;

wherein each PBX Feature definition generated by the software is configured to be combined with any other PBX Feature definition generable by the software;

wherein the distributed database system comprises a plurality of ordered sets of PBX Feature definitions comprising a first ordered set of PBX Feature definitions and a second ordered set of PBX Feature definitions;

wherein each of the first and second ordered sets of PBX Feature definitions are executable on a single server of the network of servers; and wherein a plurality of servers of the network of servers are configured to execute an ordered set of PBX Feature definitions of the plurality of ordered sets of PBX Feature definitions distributed database system.

20. The system according to claim 19 wherein a PBX Feature definition of the ordered set of PBX Feature definitions is at least one of modifiable and deletable responsive to an input from a user.

* * * * *